United States Patent [19]

Berman

[11] Patent Number: 4,879,603
[45] Date of Patent: Nov. 7, 1989

[54] MULTIPLE IMAGE, SINGLE DISPLAY SYSTEM AND METHOD

[75] Inventor: Arthur L. Berman, Milpitas, Calif.

[73] Assignee: Kaiser Aerospace & Electronics Corp., Oakland, Calif.

[21] Appl. No.: 232,350

[22] Filed: Aug. 15, 1988

[51] Int. Cl.$^4$ .................... H04N 5/445; H04N 7/08
[52] U.S. Cl. ................................ 358/242; 358/142; 358/253
[58] Field of Search ............... 358/92, 242, 142, 253

[56] References Cited

U.S. PATENT DOCUMENTS

| | | | |
|---|---|---|---|
| 2,832,821 | 4/1958 | DuMont | 358/242 |
| 3,079,462 | 2/1963 | Rosenthal | 358/142 |
| 3,633,988 | 1/1972 | Farrar | 356/247 |
| 3,833,300 | 9/1974 | Rymes | 356/13 |
| 3,858,001 | 12/1974 | Bonne | 358/88 |
| 4,179,818 | 12/1979 | Craig | 33/321 |
| 4,315,241 | 2/1982 | Spooner | 340/709 |
| 4,540,243 | 9/1985 | Fergason | 350/337 |
| 4,562,463 | 12/1985 | Lipton | 358/88 |
| 4,704,629 | 11/1987 | Vreeswijk | 358/142 |

OTHER PUBLICATIONS

*Liquid-Crystal Color Shutter Operation and Applications,* J. M. Pollack and T. J. Haven, Proc. of the SID, vol. 27/4, 1986.
*Use of Strong Surface Alignment in Nematic Liquid Crystals for High Speed Light Modulation,* James L. Fergason, SPIE, vol. 684, Dec. 19, 1986.
1980 Biennial Display Research Conference *Performance of a Matrix Display Using Surface Mode,* James L. Fergason, IEEE, 1980, pp. 177–179.
Cholesteric Structure–I Optical Properties, J. L. Fergason pp. 89–103 of *Liquid Crystals,* Edited by G. H. Brown, Published by Gordon and Breach (1967).

*Primary Examiner*—Howard W. Britton
*Attorney, Agent, or Firm*—Townsend and Townsend

[57] ABSTRACT

A multiple image, single display system (2) includes a monochromatic display source (4) which provides first and second rapidly alternating visual images (8, 10) which pass through an active polarizer assembly (14). The polarizer assembly includes an image polarizer (20), which polarizes all the light to a left hand circular polarization, and a polarization changer (22) coupled to the display source by a synchronizer 28). The polarization changer switches the polarization of the first image but not the second image. A first user (34) sees the first image, but not the second image, through a right hand circular user polarizer (16) while a second user (36) sees the second image, but not the first image, through a left hand circular user polarizer (18). The user polarizers are wave-length sensitive so they block light only if the light has the same polarization and if the light is the wavelength of the light produced by the display source; the user polarizers are otherwise transparent to visible light. This permits the invention to be used in critical low light situations.

15 Claims, 1 Drawing Sheet

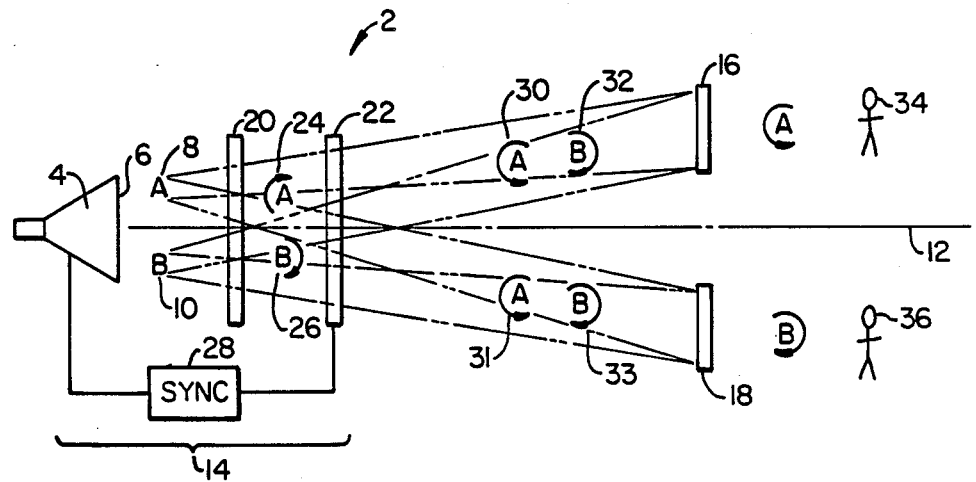
FIG._1.

MULTIPLE IMAGE, SINGLE DISPLAY SYSTEM AND METHOD

BACKGROUND OF THE INVENTION

Display screens such as cathode tube (CRT), liquid crystal display (LCD) and light emitting diode (LED) displays, are used to display information for purposes including entertainment, business and financial, navigation, and others too numerous to mention. In some situations it may be desirable to use a split screen to simultaneously provide different information to different viewers. For example, in the cockpit of an airplane, where space and weight is at a premium, it would be useful to be able to use a single display source to provide individualized information to, for example the pilot and the co-pilot: the pilot could be provided engine information while the co-pilot could see a radar map, and vice versa.

One way to do so would be to physically split the screen into two or more segments. However, doing so either reduces the amount of information which can be seen or reduces the size and clarity of the information provided. Another way would be to display the information in alternating segments, such as five seconds of engine information and five seconds of a radar map. This may be acceptable in non-critical environments, but would not be acceptable in critical situations, such as in an aircraft.

In some situations it may be desired that each viewer only see what is intended for that viewer. For example, in an interactive video game including two characters, each player would see graphic and alphanumeric information appropriate to the particular character. The above described schemes would not be appropriate in this type of situation as well.

SUMMARY OF THE INVENTION

The present invention is directed to a multiple image, single display system in which a display source provides rapidly alternating images over the viewing screen of the display source. The visual images pass through an active polarizer which is synchronously coupled to the display source and polarizes the images with different polarization orientations. Preferably, the active polarizer includes an image polarizer which polarizes all light with a chosen orientation, such as a right hand circular polarization, a polarization changer and a synchronizer. The polarization of one of the images is then changed to a different polarization, such as to left hand circular polarization, by the polarization changer coupled to the display source by the synchronizer.

Polarization chargers are discussed in the following references, which are incorporated by reference: *Use of Strong Surface Alignment in Nematic Liquid Crystals for High Speed Light Modulation,* James L. Fergason, SPIE Vol. 684, Dec. 19, 1986; 1980 Biennial Display Research Conference *Performance of a Matrix Display Using Surface Mode,* James L. Fergason, IEEE, 1980, pages 177-179.

The two differently polarized images then pass through user polarizers. The user polarizers, typically in the form of eyeglasses or face shields, have the same (preferably circular) type of polarization as the polarized images. Each image will be visible only to the user who views the image screen through a user polarizer with the same polarization orientation. For example, the image having a right hand circular polarization will pass through the right hand user circular polarizer with virtually no attenuation but will be blocked from passing through the left hand user circular polarizer.

It is preferred that the display source produce unpolarized monochromatic light. The user polarizers are preferably wavelength sensitive, that is they are essentially clear to light outside a relatively narrow bandwidth surrounding the wavelength of the monochromatic light of the display source. Thus, wavelength sensitive user polarizers can minimize the decrease in overall visibility of the user so the user's vision is not effectively reduced, as can occur with broad spectrum polarizers.

Light from the display source is preferably subjected to circular polarization rather than linear polarization. This is advantageous since with linear polarization, rotation of the user polarizers, such as in the form of eyeglasses or face shields, reduces the effectiveness of the polarizer thus allowing both images to become visible. However, with circular polarized light, such rotation of the user polarizers does not affect the polarization effectiveness of the user polarizer.

Preferably the user polarizer is made of a thin film of cholesteric liquid crystal materials. Cholestric Structure - I Optical Properties, J. L. Fergason, pages 89-103 of *Liquid Crystals,* edited by G. H. Brown, published by Gordon and Breach (1967); the disclosure of which is incorporated by reference. Polarizers made using cholesteric liquid crystal materials provide both of the desired characteristics: that of being wavelength sensitive and of being a circular polarizer.

Cholesteric polarizers are somewhat different from conventional polarizers in the way in which they block passage of light. A conventional right hand circular polarizer absorbs left hand circular polarized light while a cholesteric right hand circular polarizer reflects left hand circular polarized light.

The present invention may find its greatest utility in situations in which space and weight are critical, such as in the cockpit of an airplane. Although the invention is primarily described with reference to the direct viewing of the image screen of a display source through an active polarizer assembly, the invention could also be used in indirect viewing situations. For example, the invention could be used with a heads up display, such as that disclosed in U.S. patent application Ser. No. 065.487, filed on June 23 1987, and entitled HEADS-UP DISPLAY COMBINER UTILIZING A CHOLESTERIC LIQUID CRYSTAL ELEMENT, now abandoned, the disclosure of which is incorporated by reference.

The invention can also be used in entertainment or educational settings. For example, a video game including two protagonists can incorporate information (both graphic and alpha-numeric) destined for viewing by individual players. The normal play of the video game could be shown in color while the specialized information and instructions could be broadcast in a chosen color and subjected to left or right circular polarization according to who is to view the information. In such case light from the entire viewing screen need not pass through the active polarizer assembly; rather only light emanating from a selected portion of the screen, at which individualized the instructions and information is displayed, need pass through the active polarizer assembly.

Another use of the invention could be with commercial broadcast television. For example, two different broadcasts could be viewed at the same time on the same viewing screen, such as a news program and a movie. The broadcasts would be unchanged; only the manner in which the receiver displayed the broadcast images would be changed. Also, the same story could be broadcast but as seen from two different points of view. For example, a detective story could be told from the point of view of the detective investigating the incident in one broadcast and from the point of view of the perpetrator or victim of the incident in the other broadcast.

Using wide spectrum circular polarizers, the images can be provided in color. Doing so, however, reduces the overall passage of light through the user polarizers. In some cases, such as when viewing for entertainment, such a decrease may not be troublesome. However, in other situations, such as when flying an airplane, the overall attenuation of light would make the wide spectrum user polarizers unacceptable during night flying and at other times of reduced light availability.

Other features and advantages of the invention will appear from the following description in which the preferred embodiment has been set forth in detail in conjunction with the accompanying drawing.

BRIEF DESCRIPTION OF THE DRAWING

FIG. 1 is a schematic view illustrating the present invention.

DETAILED DESCRIPTION OF THE PREFERRED EMBODIMENT

Turning now to the figure, a multiple image, single display system 2 is shown to include a display source 4, having an image screen 6, for projecting first and second images 8. 10 along a viewing path 12. System 2 also includes an active polarizer assembly 14 and first and second user polarizers 16, 18 positioned along path 12.

Assembly 14 includes an image polarizer 20 opposite screen 6 and a polarization changer 22 opposite image polarizer 20 also positioned along viewing path 12 downstream of image polarizer 20. In the preferred embodiment image polarizer 20 is a left hand circular polarizer so that both first and second images 8, 10 have a left hand circular polarization as indicated at 24, 26. Assembly 14 includes a synchronizer 28 which couples display source 4 and polarization changer 22 so that polarization changer 22 is active only while first image 8 is passing through polarization changer 22. At other times, that is when second image 10 is passing through polarization changer 22, the polarization of the light is not changed. Thus, after images 8, 10 pass through polarization changer 22, first image 8 has a right hand circular polarization as indicated at 30, 31 while second image 10 continues to have its left hand polarization as indicated at 32, 33.

First image 8 at position 30, having a right hand circular polarization, passes through first user polarizer 16 which has a right hand circular polarization so that first viewer 34 sees first image 8. (That is, a right hand circular polarizer transmits light having right hand circular polarization and blocks light having left hand circular polarization.) However, since second image 10 at position 32 has a left hand circular polarization, first viewer 34 does not see second image 10. Similarly, second image 10 has a left hand circular polarization at position 33 so that second user polarizer 18, being a left hand circular polarizer, permits second image 10 to pass through second user polarizer 18 for viewing by second user 36 while preventing first image 8 from viewing by second viewer 36.

In the preferred embodiment, display source 4 is a monochromatic display source so that images 8, 10 are each a single color. First and second user polarizers 16, 18 are, in the preferred embodiment, wavelength sensitive polarizers. In the preferred embodiment this is achieved by using cholesteric liquid crystal films tuned to the color of the light produced by display source 4, such as green. Thus, user polarizers 16, 18 are essentially clear to all color light except for green. First user polarizer 16, having a right hand circular polarization, rejects green light having left hand circular polarization and transmits green light having right hand circular polarization. User polarizer 18 does the opposite. User polarizers 16, 18 are typically incorporated into eyeglasses or face shields worn by users 34, 36. By using such wavelength sensitive polarizers, the overall transmission of light to first and second viewers 34, 36 is substantially unattenuated. This is in contrast with broadband, wavelength insensitive polarizers, such as are used with polarized sun glasses. Thus, viewers 34, 36 do not find their vision impaired for other tasks while wearing, or otherwise viewing through, user polarizers 16, 18.

In the preferred embodiment the polarization is circular polarization as opposed to linear polarization. This is quite useful in that if the user polarizer 16, 18 is being worn by the user, as opposed to being stationary with respect to the remainder of system 2, rotational movement of polarizers 16, 18 will not change the transmission or reflectance of circular polarized images 8, 10 as can occur when linear polarizers are used. That is, the rotary orientation of a linear polarizer determines what percentage of linearly polarized light will pass through the polarizer. Thus, if linear polarization were used for the invention, if one of the viewers 34, 36 were to tilt his or her head while wearing eyeglasses incorporating user polarizer 16 or 18, a fraction of the light making up both second image 10 and first image 8 will become visible to the viewer.

In the use of display system 2, display source 4 displays first and second images 8, 10 on display screen 6 at a quite rapid alternating frequency. The rate of display of each of images 8, 10 is preferably fast enough so that the images do not appear to flicker. The display of each of first and second images 8, 10 at 60 Hz should be sufficient. First and second images 8, 10 pass through a left hand circular cholesteric polarizer 20, such as discussed in the literature cited above. First and second images 8, 10 are both provided with left hand circular polarization as indicated at 24, 26. During the period of time that first image 8 passes through polarization changer 22, changer 22 (under the control of synchronizer 28). is actuated so the polarization of first image 8 is changed from a left hand circular polarization to a right hand circular polarization, as indicated at positions 30, 31. Polarization changer 22 is adjusted by synchronizer 28 during the period of time second image 10 passes through changer 22 so that second image 10 retains its left polarization as indicated at positions 32, 33. Images 8, 10 both sequentially reach user polarizers 16, 18. User polarizer 16 is a right hand circular polarizer and thus permits right hand polarized image A to pass through to user 34 while reflecting left hand polarized image 10. Similarly, second user polarizer 18, being a left hand circular polarizer, reflects right hand circular polarized first image 8 and permits left hand circular polarized second image 10 to pass through to viewer 36.

First and second user polarizer 16, 18 include cholesteric liquid crystal films as discussed in the Fergason article referred to above. Because user polarizers 16, 18 are wavelength sensitive, visual acuity for viewers 34, 36 is substantially unimpaired because only light having a chosen circular polarization of a certain color (actually a narrow band of wavelengths) is not transmitted to the viewer. That is, user polarizers 16, 18 are essentially clear to virtually all light with the exception of circularly polarized light of a chosen color.

A separate polarization changer 22 and a right hand or a left hand circular polarizer and a right hand or a left hand circular polarizer could be combined with each user polarizer 16, 18. This would enable use of much smaller, and thus less expensive, polarization changers 22. Doing so also would help eliminate any problems associated with the angularity of viewing image screen 6. However, the combination would result in optically darker user glasses and would also require that the synchronization signals be brought to the user polarizers, typically eyeglasses or face shields.

Other modification and variation can be made to the disclosed embodiment without departing from the subject of the invention as defined in the following claims. For example, a multi-color system could be used by stacking two or more wavelength sensitive polarizers (typically cholesteric liquid crystal circular polarizers) as the user polarizer. The user polarizers 16, 18 made with such stacked polarizers would remain essentially clear.

What is claimed is:

1. A multiple image, single display system comprising:
    a display source providing first and second alternating visual images along a light path at a chosen rate and at first and second wavelengths;
    an active polarizer assembly, synchronously coupled to the display source and positioned along the light path, which polarizes the first image with a first polarization orientation and the second image with a second polarization orientation;
    a first, wavelength sensitive user polarizer positioned downstream of the polarizer assembly, associated with a first user which blocks transmission of light at about the second wavelength and the second polarization orientation: and
    a second, wavelength sensitive user polarizer, positioned downstream of the polarizer assembly, associated with a second user which blocks transmission of light at about the first wavelength and the first polarization orientation;
    whereby the first viewer sees the first image but not the second image and the second viewers sees the second image but not the first images without substantially affecting the non-display source vision of the users.

2. The system of claim 1 wherein the first polarization orientation is a circular polarization orientation.

3. The system of claim 1 wherein the first user polarizer includes a cholesteric liquid crystal film.

4. The system of claim 1 wherein the first and second wavelengths are the same.

5. The system of claim 1 wherein the display source includes a cathode ray tube.

6. The system of claim 1 wherein the polarizer assembly includes an image polarizer for initially polarizing both of the first and second images with the first polarization orientation.

7. The system of claim 6 wherein the polarizer assembly includes a polarization charger, positioned downstream of the image polarizer, for changing the polarization of the second image to the second polarization orientation.

8. A multiple image, single display system comprising:
    a time sequential display source providing first and second rapidly alternating visual images at a chosen rate along an image path at first and second wavelengths;
    an image polarizer positioned along the image path for polarizing the first and second images to a first, circular polarization orientation;
    a polarization changer positioned along the image path downstream of the image polarizer for changing the circular polarization orientation of light passing along the light path from the first to a second circular polarization orientation when in a first state and for leaving the circular polarization orientation of said light unchanged when in a second state;
    a synchronizer, coupled to the display source and the polarization changer, for switching the polarization changer between the first and second states at the chosen rate synchronous with the provision of the first and second images so the first image passing through the polarization changer has its first circular polarization orientation changed to the second polarization orientation and the circular polarization orientation of the second image is unchanged as it passes through the polarization changer; and
    first and second wavelength-sensitive, user polarizers, associated with first and second users respectively, which only blocks transmission of light to the first user which is about the second wavelength and has the second circular polarization orientation and only blocks light to the second user which is about the first wavelength and has the first circular polarization orientation:
    whereby the first user does not see the second image and the second user does not see the first image.

9. The system of claim 8 wherein the display source is a monochromatic display source and the first and second wavelength are the same.

10. A method for displaying first and second images on a single display source for simultaneous viewing by first and second viewers, the first viewer viewing only the first image and the second viewer viewing only the second image, comprising the following steps:
    alternately projecting first and second visual images at a chosen rate;
    intercepting the first and second images by a polarizer assembly;
    polarizing the first image with a first polarization orientation by the polarizer assembly;
    polarizing the second image with a second polarization orientation by the polarizer assembly;
    intercepting the first and second polarized images by first and second user polarizers associated with the first and second users:

blocking transmission of the second polarized image by the first user polarizer so the first viewer views the first image but not the second image; and blocking transmission of the first polarized image by the second user polarizer so the second viewer views the second image but not the first image.

11. The method of claim 10 wherein the second polarized image blocking step is carried out using a cholesteric liquid crystal film.

12. The method of claim 10 wherein the first image polarizing step includes polarizing the first image with a first circular polarization orientation.

13. The method of claim 10 wherein the projecting step is carried out by alternately projecting the first and second visual images at first and second wavelengths.

14. The method of claim 13 wherein the second polarized image blocking step is carried out by blocking transmission of light which has both the second wavelength and the second polarization orientation so that the first viewer sees the first image but not the second image without substantially affecting the nondisplay source vision of the first viewer.

15. The method of claim 14 wherein the first polarized image blocking step is carried out by blocking transmission of light which has both the first wavelength and the first polarization orientation so that the second viewer sees only the second image without substantially affecting the non-display source vision of the second viewer.

* * * * *